United States Patent [19]
Persson

[11] Patent Number: 5,967,221
[45] Date of Patent: Oct. 19, 1999

[54] DETACHABLE WEAR PLATE SUITABLE FOR FOUNDRY EQUIPMENT AND FOR CONVEYING GREEN SAND MOULDS

[75] Inventor: Viggo Persson, Niva, Denmark

[73] Assignee: Georg Fischer Disa A/S, Herlev, Denmark

[21] Appl. No.: 08/859,529

[22] Filed: May 20, 1997

[30] Foreign Application Priority Data

Mar. 26, 1997 [DK] Denmark ................................ 0360/97

[51] Int. Cl.⁶ ............................ B22C 19/00; B65G 29/00
[52] U.S. Cl. .................... 164/159; 198/699; 198/867.15; 403/316; 403/393
[58] Field of Search ..................................... 403/316, 353, 403/393; 198/698, 699, 867.15; 164/159

[56] References Cited

U.S. PATENT DOCUMENTS

| | | | |
|---|---|---|---|
| 4,225,265 | 9/1980 | Hooker et al. ...................... | 403/393 X |
| 4,898,083 | 2/1990 | Jones ..................................... | 403/353 X |
| 5,716,154 | 2/1998 | Miller et al. ......................... | 403/353 X |

FOREIGN PATENT DOCUMENTS 470472  1/1929  Germany ................................ 403/353

*Primary Examiner*—J. Reed Batten, Jr.
*Attorney, Agent, or Firm*—Larson & Taylor

[57] ABSTRACT

In a conveyor or other foundry equipment having surfaces protected by a wear plate secured to a structural part of the equipment, the wear plate is detachably secured by means of studs permanently secured to a structural part of the equipment. Heads of the studs cooperate with engagement flanges in keyhole-like recesses in the wear plate, all in such a manner that the wear plate can be detached by sliding it in a direction to disengage the flanges from the heads. With this arrangement, the wear plate can be attached and detached without the use of tools other than possibly a soft mallet, and without the use of screws exposed at the wear face of the wear plate. The arrangement can also be used to detachably secure a wear plate to other structural parts of foundry equipment such as a moulding chamber or a clamp.

19 Claims, 4 Drawing Sheets

DETACHABLE WEAR PLATE SUITABLE FOR FOUNDRY EQUIPMENT AND FOR CONVEYING GREEN SAND MOULDS

TECHNICAL FIELD

The present invention relates to a detachable wear plate arrangement suitable for foundry equipment.

BACKGROUND ART

In previously known foundry equipment of this kind, wear slats or wear plates are detachably secured to the structural parts of the equipment by means of threaded fasteners, e.g. screws countersunk in such a manner, that the top surface of their heads lie flush with the surface of the slats or plates. In the present specification and claims, the term "wear plate" is intended to include wear slats.

In order to make it possible to unscrew the threaded fasteners, the heads of the latter must necessarily be provided with some kind of screwdriver recess or the like. Even if the tops of the heads of the fasteners lie perfectly flush with the surface of the wear plate concerned, the screwdriver recesses will unavoidably constitute discontinuities in the surface. In the case of wear plates in moulding chambers, tiny protrusions on the sand moulds will be produced by the screwdriver recesses, and these protrusions will, when "scrubbed off" during the subsequent handling of the moulds, contaminate the moulds and/or the equipment with small quantities of sand which, although small are still capable of causing problems.

Further, if the countersunk screw heads do not lie perfectly flush with the surface of the wear plate concerned, relative movement between the wear plate and the sand moulds in contact with them may cause damage to the moulds, at the same time liberating small quantities of sand with the consequent problems.

A further disadvantage of using screwed fasteners is that they generally have to be screwed or unscrewed individually, thus requiring considerable time for attaching or detaching the wear plate concerned, also implying a risk of damage to the latter by inadvertent contact with the screwdriver bit.

DISCLOSURE OF THE INVENTION

It is the object of the present invention to provide an arrangement for a detachable wear plate, in which the disadvantages referred to above are eliminated. With a wear plate arrangement, according to the present invention, the wear plates can be attached to and detached from the structural parts concerned by a simple translatory movement without the necessity of using tools other than possibly a soft mallet, and as there are no holes or the like for screwed fasteners penetrating the wear plates, the surfaces of the latter will be perfectly smooth.

Advantageous embodiments of the arrangement according to the present invention, the effects of which—beyond what is obvious—are explained in the following detailed part of the present description.

The present invention also relates to a conveyor and a moulding machine embodying a wear plate arrangement according to the invention.

BRIEF DESCRIPTION OF THE DRAWINGS

In the following detailed part of the present description, the invention will be explained in more detail with reference to the exemplary embodiment of the securing means used in the arrangement according to the invention shown in the drawings, in which.

DESCRIPTION OF THE PREFERRED EMBODIMENT

Figure 1:
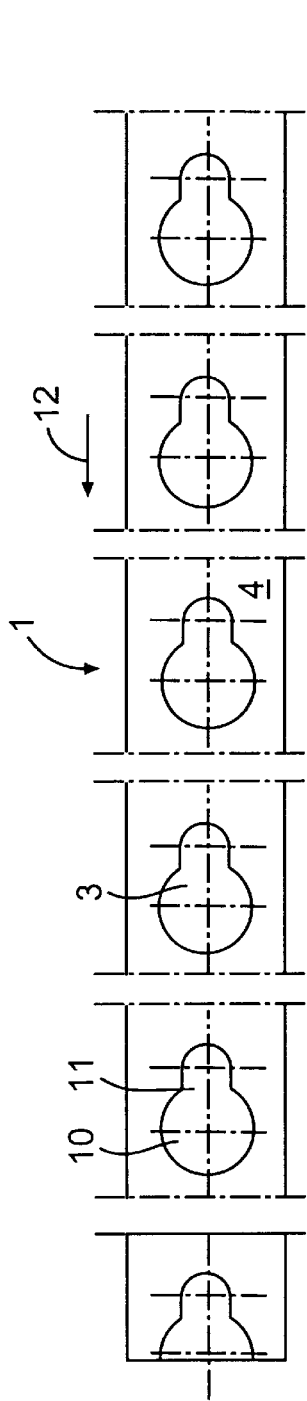
FIG. 1 shows a wear plate with elongate recesses as viewed towards the face intended to abut against a structural part such as a conveyor slat.
Figure 2:
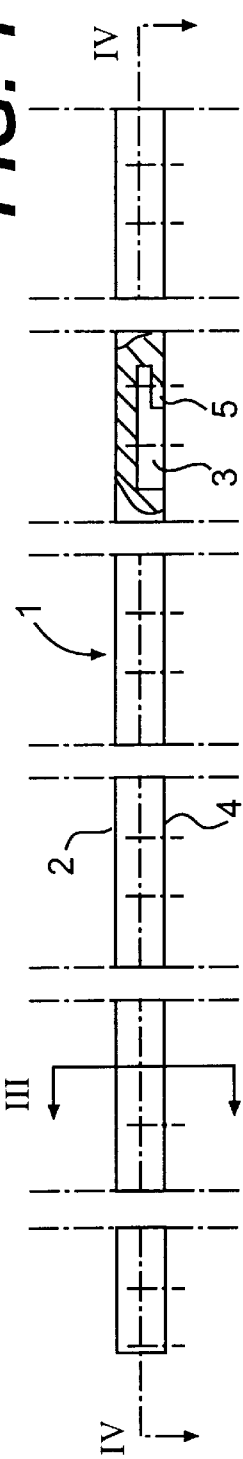
FIG. 2 is a side view, partly in section, of the wear plate, shown in FIG. 1.
Figure 3:
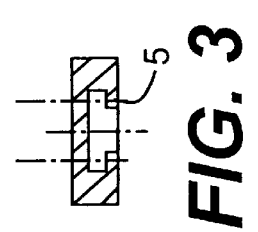
FIG. 3 is a sectional view taken on the line III—III in FIG. 2.

A wear plate 1 shown in FIGS. 1–7 and 9 is adapted to be secured to a conveyor slat constituting a part 20 of a foundry conveyor for advancing freshly moulded sand moulds and of the kind comprising at least two grates or grids adapted to move "paracyclically", i.e. in constant orientation in cycles consisting of successive upward, forward, downward and rearward movements, respectively in such a manner that each grate or grid supports the moulds during said forward movement during part of a common cycle, so as to provide constant support and forward movement of moulds resting on the grates or grids, the upper faces of which are protected by wear plates like the wear plate 1 shown in FIGS. 1–7 and 9. Such conveyors are well known with the foundry trade, and one example is described in U.S. Pat. No. 3,744,552.

As may be seen from FIGS. 2, 5, 6 and 9 the upper face 2 of the wear plate 1 is perfectly smooth, and the reason for this is that the securing means for detachably securing the wear plate 1 to the structural part 20 concerned, in this case a foundry conveyor slat, does not comprise fasteners penetrating the wear plate, but only a number of elongate recesses 3 communicating solely with the lower face 4 of the plate 1. The structural part 20 to which the wear plate 1 is detachably securable, is shown diagrammatically in FIG. 9, but is omitted from the other figures for clarity. Structural part 20 may be, for example, a conveyor slat or a clamp of a foundry conveyor, a wall of a foundry moulding chamber, or other structural part of foundry apparatus which utilizes detachable wear plates.

Figure 6:
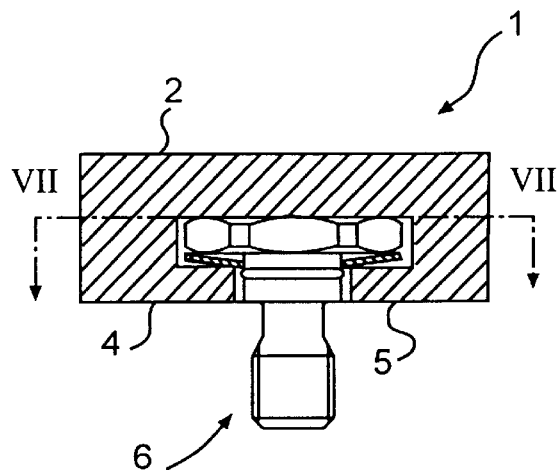
Figure 8:
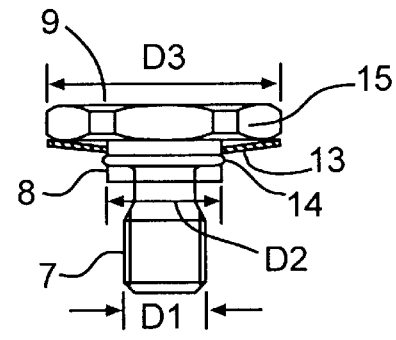
FIG. 8 shows the engagement stud shown in FIGS. 5–7.
Figure 7:
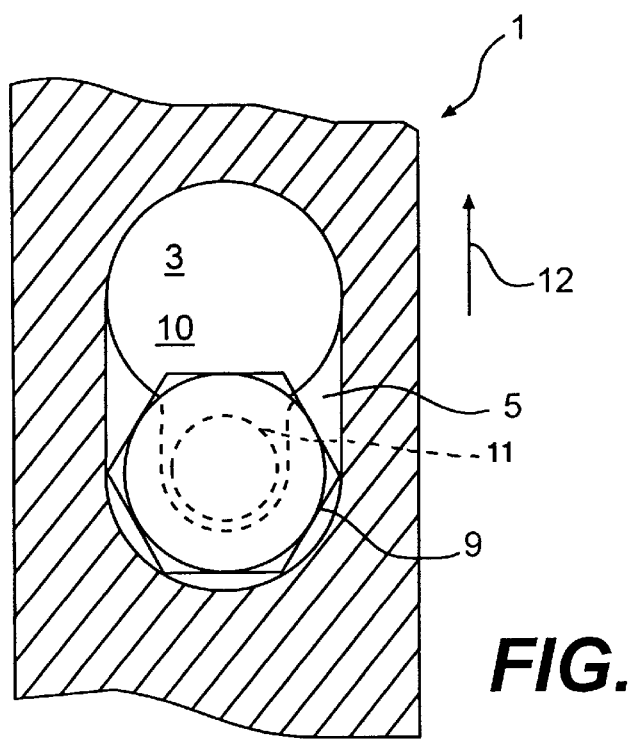
FIG. 7 is a sectional view taken on the line VII—VII in FIG. 6.
Figure 9:
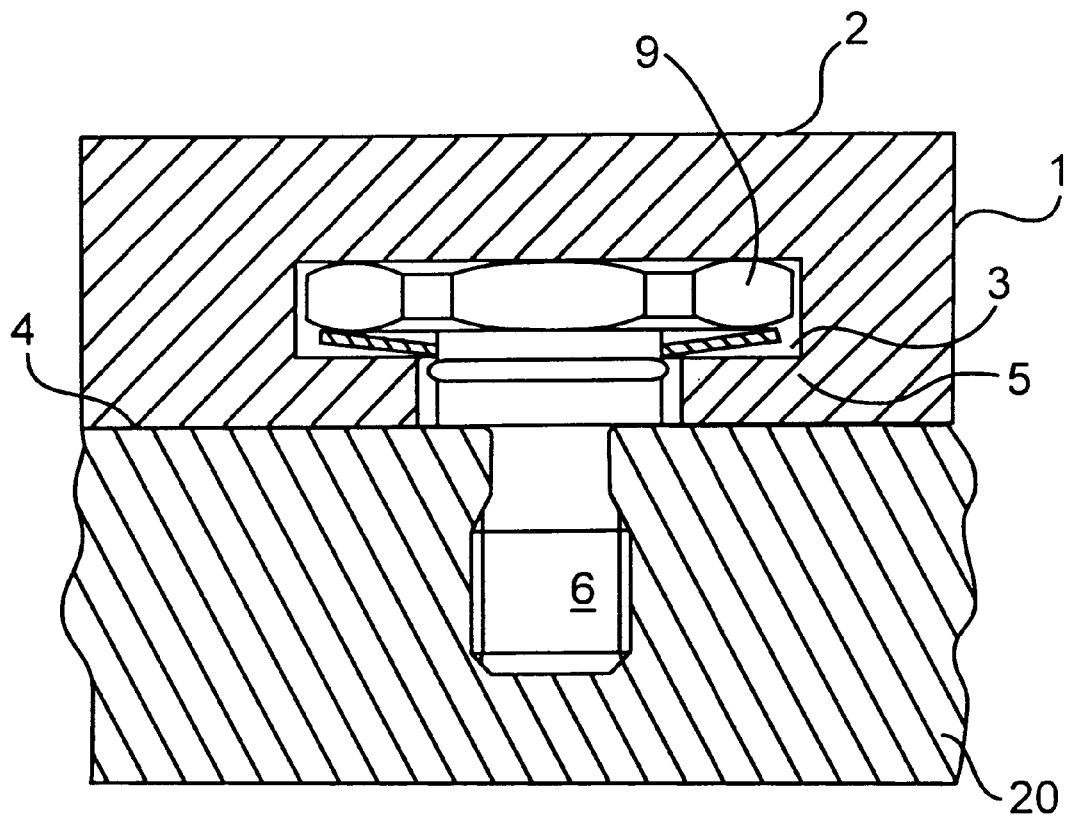
FIG. 9 is diagrammatic sectional view similar to that of FIG. 6, showing a wear plate detachably secured to a structural part of foundry apparatus.

As may be seen particularly from FIGS. 6 and 7, the elongate recess 3 is oval in shape and is partly covered by an engagement flange 5, the lower side of which lies flush with the lower face 4 of the plate 1. As may be seen from FIGS. 1, 4 and 7, the engagement flange 5 leaves a keyhole-shaped passage giving access to the inner, top part of the recess 3.

Please note that in the present description and claims the expressions "up", "down", "upper", "lower", etc., refer to the orientations shown in FIGS. 2, 3, 5, 6 and 9, but do not, of course, represent a limitation on the orientation of the arrangement according to the invention as used in actual practice.

The part of the securing means intended to be associated with the structural parts 20 of the conveyor, e.g. conveyor slats, is, as may be seen in FIGS. 5–8, constituted by a number of headed engagement studs 6 comprising a threaded shank 7 with a diameter D1, a cylindrical stem 9 with a diameter D2 somewhat larger than the diameter D1 of the threaded shank 7, and a head 9 with a diameter D3 considerably greater than the diameter D2 of the stem 8.

On the other hand, the part of the securing means associated with the wear plate 1 is constituted by the above-mentioned elongate recesses 3, particularly the U-shaped engagement flanges 5.

Referring particularly to FIGS. 5–8, the manner in which the engagement flanges 5 in the elongate recesses 3 in the wear plate 1 cooperate with the heads 9 on the engagement studs 6 to hold the slat 1 in abutment with the conveyor wear plate or other structural part 20 concerned will now be explained.

Figure 4:
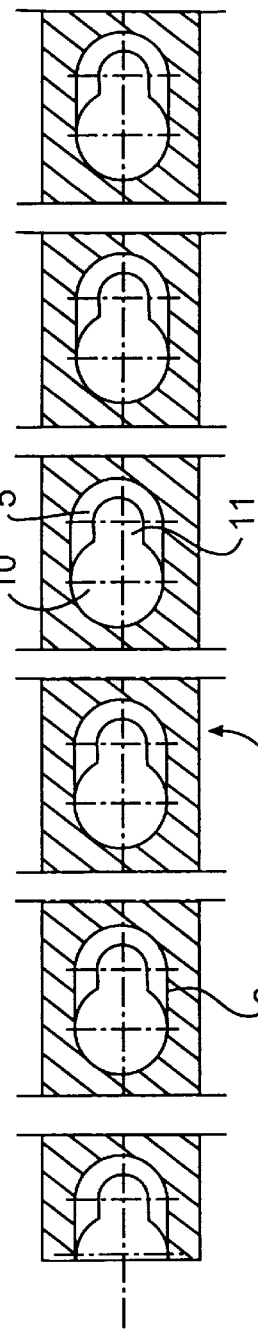
FIG. 4 is a sectional view taken on the line IV—IV in FIG. 2, FIG. 5 at a greatly enlarged scale shows an engagement stud adapted to be permanently secured to a structural part, in cooperation with a part shown in section of a wear plate as shown in FIGS. 1–4, FIG. 6 at one-half the scale of FIG. 5 shows a sectional view taken on the line VI—VI in FIG. 5.
Figure 5:
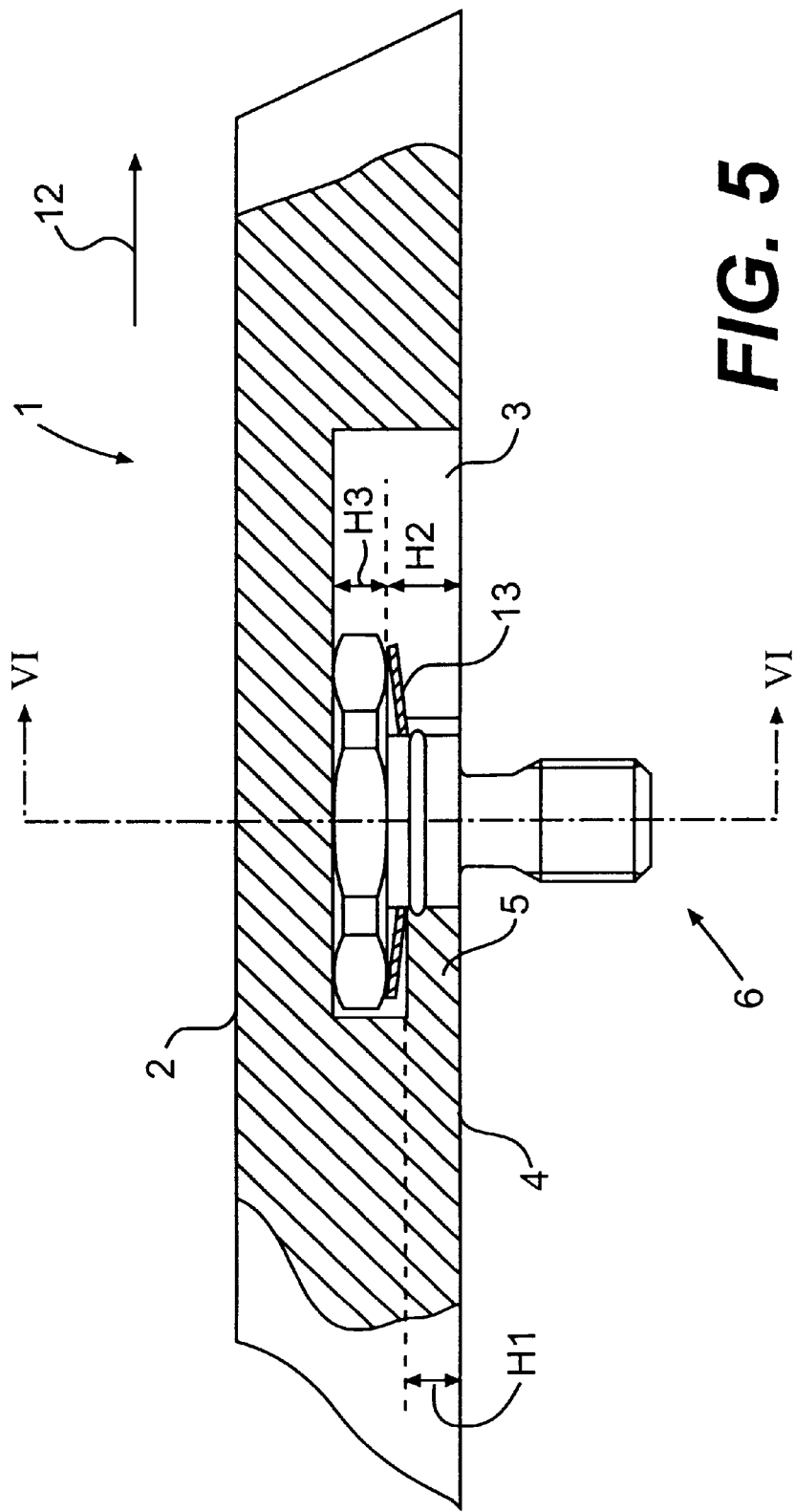

As may be seen from FIGS. 1, 4 and 7, the wider part 10 of the keyhole-shaped mouth of the recess 3 is wide enough to let the head 9 on the stud 6 pass, whereas the narrower part 11 is only wide enough to accommodate the stem 8. Thus, once the wear plate 1 has been moved into engagement with the studs 6 by first positioning it such that the wider parts 10 of the recesses 3 surround the heads 9 on the studs 6, then moving it in the direction of its own length as indicated by the arrows 12 in FIGS. 1, 5 and 7 to make the engagement flanges 5 pass below the heads 9, the latter will in the final position shown in FIGS. 5–7 prevent movement of the wear plate 1 in a transverse direction away from the conveyor slat (not shown). When the wear plate 1 has been placed in this final engagement position, it may be prevented from being disengaged by means of suitable stops (not shown) blocking longitudinal movement in the opposite direction of the arrows 12. These stops may comprise simple fasteners at one end of each wear plate, but not protruding beyond the plane of its upper face 2.

When the securing arrangement according to the present invention is used for securing wear plates on the walls in moulding chambers, used in moulding machines for making sand moulds, the stops may simply be constituted by adjacent walls in the moulding chamber, which is normally adapted to be dismantled for maintenance and repair.

In using the present detachable securing arrangement for wear plates in conveyors of the kind referred to above, positive stops may not always be required to prevent the wear plates 1 from going out of engagement with the conveyor slats concerned, as will be explained below.

As may be seen in FIGS. 5, 6, 8 and 9, each engagement stud 6 is encircled by a so-called saucer spring 13, oriented to converge downwardly. The spring 13 is prevented from sliding down along the stem 8 by a locking ring 14 engaged in an annular groove in the stem 8.

When, during the procedure of securing the wear plate 1 to the structural part 20 of the apparatus by sliding the engagement flange 5 into engagement with the head 9 on the stud 6, the saucer spring 13 also slides into engagement with the upper face of the flange 5, at the same time being compressed elastically in the axial direction, because the sum of the height H1 of the upper face of the flange 5 is greater than the difference between the height H2 of the stem 8 and the unstressed thickness of the spring 13.

The force, with which all the saucer springs 13 are held in compression, will obviously produce a reaction force urging the wear plate 1 against the supporting surface on the conveyor slat concerned, resulting in considerable frictional resistance against disengagement, i.e. movement in the opposite direction of the arrows 12.

The retaining effect may be further enhanced by forming a pair of recesses (not shown) in the upper face of each engagement flange 5, said recesses being shaped to accommodate the saucer spring 13 in somewhat reduced elastic compression. With such an arrangement, the springs 13 and the recesses will cooperate to provide the well-known "click-stop" effect.

To make it possible to screw the studs 6 into and out of engagement with a structural part protected wear plate 1, their heads 9 are provided with suitable turning-tool engagement features, such as hexagon faces 15 for engagement with a wrench. The normal operations of engaging or disengaging the wear plates with or from the structural part concerned do not, however, require the use of tools, with the possible exception of a soft-headed mallet for knocking the wear plates into or out of position with gentle blows on one end or the other.

It is preferred to place the elongate recesses 3 in the longitudinal direction of the wear plates 1 so as to allow thermal expansion or contraction of the wear plates relative to the conveyor slats, the temperatures of which will normally vary less than those of the wear plates 1, as the latter will be in direct contact with sand moulds heated by the hot casting metal in them. Suitable clearances between the lateral surfaces on the stems 8 and the heads 9 on the one hand and the surfaces in the recesses 3 and on the flanges 5 facing them will allow such thermal expansion and contraction as well as limited sideways movements of the wear plates 1 to allow for deformations.

I claim:

1. In apparatus comprising at least one detachable wear plate and means for detachably securing said wear plate to a structural part of the apparatus to protect the apparatus from wear, the improvement wherein said securing means comprises;

a plurality of male members permanently secured to a structural part, each of said male members comprising a stem protruding from a surface of said structural part, a head secured to or integral with said stem and situated on top of the latter and having a greater diameter than the diameter of the stem, and a female member comprising a plurality of elongate recesses in the lower face of said wear plate each of said recesses being adapted to receive a respective one of said male members, and having a width not less than the diameter of said head, a length considerably greater than said diameter, and a depth not less than the sum of the height of said stem and the height of said head, and an engagement flange protruding from the sides and from one end of each of said elongate recess into the recess so as to form in each of said recesses a keyhole-shaped entry portion having a wider part which is dimensioned to allow passage of said head, and having a narrower part which is dimensioned not to allow passage of said head but to allow said stem to extend therethrough, said engagement flange lying at a distance from the top of said elongate recess not less than the height of said head, and wherein each of said elongate recesses extends in a direction allowing simultaneous engagement or disengagement of said engagement flange of each of said recesses with or from a respective one of said heads received therein.

2. Apparatus according to claim 1, wherein the height of said stem is greater by a short distance shorter than the height of the upper face of said engagement flange above the lower face of said plate, wherein an elastically compressible annular disc extends around said stem in a position adjacent said head, said disc in its uncompressed state having an axial height greater than said short distance and in its compressed state having a reduced axial length slightly greater than or substantially equal to said short distance, and wherein the lower part of the periphery of said disc and/or the upper part of the edge of said engagement flange is/are so shaped as to allow the disc to be moved into engagement with the upper side of the flange.

3. Apparatus according to claim 2, wherein said elastically compressible annular disc is constituted by a saucer spring.

4. Apparatus according to claim 2, wherein a spring locking ring is provided in a groove around said stem so as to protrude from the latter in a position close to and below said elastically compressible annular disc so as to prevent downward movement of the latter in the absence of said engagement flange.

5. Apparatus according to claim 2, wherein said engagement flange is provided with an upwardly facing recess adapted to engage said elastically compressible annular disc in a manner to make the latter resist disengagement from said flange.

6. Apparatus according to claim 2, wherein said elastically compressible annular disc comprises rubber or an elastomeric synthetic resin.

7. Apparatus according to claim 2 wherein said lower part of the periphery of said disc is conically shaped.

8. Apparatus according to claim 2 wherein said upper part of the edge of said engagement flange is chamfered.

9. Apparatus according to claim 1, wherein the lower face of said engagement flange is flush with the lower face of said plate.

10. Apparatus according to claim 1, wherein said male member comprises a screw-threaded part extending below said stem and threadedly engaged in a screw-threaded bore in said structural part, and wherein said head is so shaped as to be engageable by a spanner wrench.

11. Apparatus according to claim 10, wherein the diameter of said screw-threaded part is less than the diameter of said stem, the latter's lower end being terminated by a radial face abutting against the upper face of said structural part.

12. Apparatus according to claim 10 wherein said head has hexagon faces.

13. Apparatus according to claim 1, further comprising blocking means secured to said structural part in a position in which the blocking means are capable of preventing movement of said plate in a direction causing disengagement of said engagement flange from said head, said blocking means being adapted to be moved or removed from said position so as to allow said disengagement.

14. Apparatus according to claim 1, wherein said plate is made of at least one material selected from the group consisting of metal, and high-molecular synthetic resin material.

15. Apparatus according to claim 14 wherein said plate comprises a laminate.

16. Apparatus according to claim 1, wherein said each of said elongate recesses extends in a direction, of which at least a substantial component is parallel to a longitudinal direction of said wear plate.

17. Apparatus according to claim 1 wherein said structural part of said apparatus comprises a conveyor for advancing a freshly moulded sand mould, said conveyor comprising at least two grates or grids adapted to move in constant orientation in cycles consisting of successive upward, forward, downward and rearward movements, respectively, in such a manner that each grate or grid supports a mould during said forward movement during part of a common cycle, so as to provide constant support and forward movement of a mould resting on said grates or grids, an upper face of each of said grates or grids being protected by said wear plate, said wear plate being detachably secured to each of said upper faces of said grates or grids at at least two points along their length by said securing means.

18. Apparatus according to claim 17 wherein said structural part comprises a clamping member protected by a further detachable wear plate, said further wear plate being detachably secured to said clamping member by said securing means.

19. Apparatus according to claim 1 wherein said structural part of said apparatus comprises a moulding chamber, an inner wall of said moulding chamber being protected by said wear plate detachably secured to said inner wall by said securing means.

\* \* \* \* \*